United States Patent [19]

Perry

[11] Patent Number: 4,815,679
[45] Date of Patent: Mar. 28, 1989

[54] WHEEL BRAKE ASSEMBLY

[76] Inventor: John C. Perry, 3170 Falcon, Carlsbad, Calif. 92008

[21] Appl. No.: 47,052

[22] Filed: May 6, 1987

[51] Int. Cl.⁴ .............................................. B64C 25/44
[52] U.S. Cl. .................................. 244/111; 188/18 R; 188/18 A; 188/2 D
[58] Field of Search ............................ 244/103 R, 111; 188/77 R, 18 R, 18 A, 2 D

[56] References Cited

U.S. PATENT DOCUMENTS

| | | | |
|---|---|---|---|
| 997,290 | 7/1911 | Hart . | |
| 1,573,100 | 2/1926 | Sperry | 188/77 R |
| 1,622,785 | 3/1927 | Hollingsworth | 188/77 R |
| 1,673,211 | 6/1928 | Staude | 188/77 R |
| 1,857,104 | 5/1932 | Wilkinson et al. | 188/77 R |
| 1,919,520 | 7/1933 | Laddan et al. | 244/111 |
| 2,055,335 | 9/1936 | Carnes . | |
| 2,136,111 | 11/1938 | Laurent . | |
| 2,425,116 | 8/1947 | Musselman | 188/77 R |
| 2,504,077 | 4/1950 | Loudenslager | 244/103 R |
| 2,680,593 | 6/1954 | McIntire . | |
| 2,807,427 | 9/1957 | Herrick . | |
| 2,995,680 | 10/1960 | Caero . | |
| 3,402,692 | 9/1968 | Hickman et al. | 188/77 R |
| 3,828,895 | 8/1974 | Boaz . | |
| 4,179,013 | 12/1979 | Kine . | |
| 4,310,972 | 1/1982 | Isberg et al. . | |
| 4,591,027 | 5/1986 | Takimiya et al. . | |

Primary Examiner—Galen Barefoot
Attorney, Agent, or Firm—Donald R. Nyhagen

[57] ABSTRACT

A relatively simple, lightweight, low cost brake assembly for relatively light weight vehicles, particularly so-called ultralight airplanes which may be quickly and easily installed on and removed from a vehicle. The brake assembly has a housing to be fixed on a vehicle wheel support, such as an axle, and rotatably mounting a brake rotor having means for compling to a wheel. Operable between the housing and rotor are selectively operable brake means for applying a braking force to the rotor.

25 Claims, 3 Drawing Sheets

WHEEL BRAKE ASSEMBLY

FIELD OF THE INVENTION

This invention relates generally to wheel brakes and more particularly to a novel wheel brake assembly for ultralight airplanes and other relatively lightweight vehicles.

DESCRIPTION OF THE PRIOR ART

As will become apparent from the following description, the wheel brake assembly of this invention may be used on various types of relatively lightweight vehicles. The brake assembly is particularly suited to use on so-called ultralight airplanes, however, and for this reason will be described in such context.

Ultralight airplanes, commonly referred to simply as ultralights and so referred to in the following description, have acquired wide-spread popularity for low cost recreational flying. Simply stated, an ultralight is a relatively small, lightweight airplane having a frame commonly constructed of aluminum tubing and covered by a suitable fabric. Ultralights are made in a variety of types and sizes ranging from essentially a motor driven home glider to a somewhat normal airplane design.

While wheel brakes are highly desirable on ultralights for both normal braking purposes and steering purposes, they are not furnished as standard equipment on many ultralights. The prior art, of course, is replete with a vast assortment of brakes for various purposes. By way of example are the brakes described in the following patents:

U.S. Pat. No. 997,290 discloses a friction band automobile wheel brake.

U.S. Pat. No. 2,055,335 discloses a friction V-belt brake for a cable drum.

U.S. Pat. No. 2,136,111 discloses a friction band brake for a cable drum.

U.S. Pat. No. 2,807,427 discloses a friction band brake for a lift surface positioning shaft of a convertiplane.

U.S. Pat. No. 2,680,593 discloses a friction disc brake for an escape cable.

U.S. Pat. No. 2,955,680 discloses a friction disc brake of general application.

U.S. Pat. No. 3,828,895 discloses a self-energizing friction band brake for off-road vehicles.

U.S. Pat. No. 4,179,013 discloses a friction band bicycle brake.

U.S. Pat. No. 4,310,972 discloses a friction band brake for a chain saw.

U.S. Pat. No. 4,591,027 discloses a friction band bicycle brake.

While the above and other wheel brakes may provide an effective braking action they are either not suitable for use as ultralight wheel brakes or, even if usable for this purpose, would be less than totally satisfactory because of their size, weight, cost, complexity and/or difficulty of installing and removing them on and from an existing ultralight as a retrofit brake.

Ultralight brake accessories are available for installation on ultralights either as original equipment or as retrofit brake assemblies. These existing brake accessories have various disadvantages, foremost among which are their weight, complexity, cost and difficulty of installing them on and removing them for repair or servicing from an ultralight.

Accordingly, a definite need exists for an improved ultralight brake. This invention provides such an improved brake. As noted earlier, however, while the brake assembly of the invention is particularly adapted for and will be described in the context of its use as an ultralight wheel brake, it may be used for other purposes.

SUMMARY OF THE INVENTION

Simply stated, the brake assembly of the invention has a relatively stationary or fixed part, a rotor for mounting a wheel, bearing means rotatably mounting the rotor on the fixed part, and selectively operable brake means operable between the rotor and fixed part for exerting a braking force on the rotor. The fixed part has means for mounting it on the vehicle to be equipped with the brake assembly.

The disclosed embodiment of the invention is designed for use as an ultralight wheel brake. To this end, the disclosed brake assembly is uniquely constructed and arranged to be mounted on a conventional ultralight wheel support or landing gear including wheel struts, extending below the fuselage and laterally projecting axles at the lower ends of the struts. In a conventional ultralight, its wheels are rotatably mounted on these axles.

According to the present invention, a wheel brake assembly of the invention is mounted on each axle inboard of the respective wheel with the axle extending through a coaxial bore in the fixed part of the brake assembly. This part is fixed against rotation relative to the axle. The brake rotor is coupled to the wheel, as by lug bolts on the rotor extending through holes in the wheel hub.

Extending between each assembly and the pilot's station are means, such as a cable connecting the brake means of the assembly to a brake actuator, such as a brake pedal, at the pilot's station. The brake means of the two brake assemblies are operable independently either in unison or separately to both brake and steer the ultralight on the ground.

In the presently preferred brake assembly described herein, the fixed brake part is an axially thin or narrow, generally disc-like housing having a circular side wall circumferentially bounded by an cylindrical edge wall which projects beyond one side of the side wall. The housing has an open side opposite the side wall and a coaxial hub which extends from the side wall to the open housing side to form a journal bearing rotatably mounting the brake rotor. The axle bore extends coaxially through this hub. The housing is releasably secured to the axle by a cross pin which extends through the hub and axle and is retained in the hub by the rotor. The rotor, in turn, is held on the hub by a shoulder plate which is releasably secured to the end of the hub.

The brake assembly is removable from the axle by first removing the shoulder plate and then the rotor from the hub, then removing the cross pin from the hub and axle, and finally sliding the brake housing from the axle. The brake assembly is installed by reversing this procedure.

The brake rotor is a friction disc journalled on the hub between the housing side wall and shoulder plate. Extending axially from this disc through the open side of the housing are lugs for coupling the wheel to the disc. Extending about the periphery of the rotor disc is a brake band fixed at one end to the housing and having its other end accessible externally of the housing for constricting the band about the disc for exerting a braking force on the rotor and wheel.

As noted, in an ultralight, a brake assembly of the invention will be mounted on each wheel supporting axle. These two wheel brakes may be operable individually and in unison to both brake and steer the ultralight on the ground.

DESCRIPTION OF THE PREFERRED EMBODIMENTS

Figure 1:
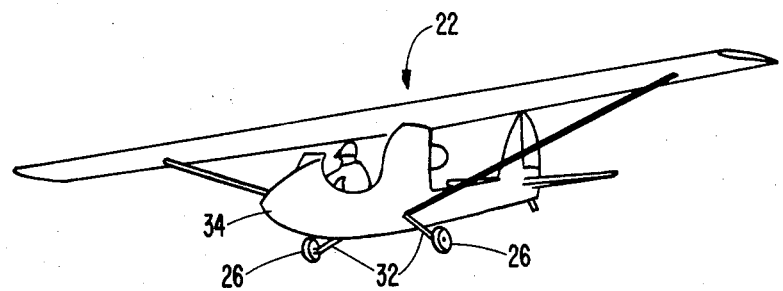
FIG. 1 illustrates an ultralight airplane equiped with wheel brake assemblies according to this invention.

Turning to the drawings, the illustrated wheelbrake assembly 10 of the invention includes a relatively stationary or fixed part 12, a rotor 14, and bearing means 16 rotatably mounting the rotor on the fixed part for rotation on an axis 18. The fixed part 12 includes means 20 for mounting the brake assembly on a vehicle 22 with the part fixed against rotation. Rotor 14 includes means 24 for coupling a wheel 26 to the rotor coaxially with the rotation axis 18. Operable between the fixed part 12 and rotor 14 are brake means 28 which are selectively operable to resist rotation of the rotor and thereby the wheel relative to the part.

A unique feature of the brake assembly resides in its unitary, self-contained construction, whereby it may be quickly and easily installed on and removed from the vehicle. Other important features of the brake assembly are it simplicity of construction, light weight, and low cost.

These features of the brake assembly uniquely adopt it for use on an ultralight airplane. The presently preferred inventive embodiment illustrated is particularly designed for this purpose.

As noted earlier, ultralight airplanes, or ultralights as they are commonly called, are relatively small, simple, lightweight airplanes which have gained widespread popularity for recreational flying which is restricted to relatively unpopulated areas. Ultralights are made in a great variety of sizes and styles. FIG. 1 illustrates one example of such an ultralight on which the illustrated brake assembly 10 may be used.

Since the illustrated ultralight 22 is conventional and the invention is concerned only with wheel brakes for the ultralight, the latter need not be described in any great detail. Suffice it to say that the ultralight has a landing gear including landing gear wheel struts 32 extending below the fuselage 34 and including lower axles 36 on which the ultralight wheels 26 are rotatably mounted. An illustrated brake assembly 10 of the invention is mounted on each axle 36 inboard of the respective wheel 26 and is coupled to the wheel in the manner explained below to brake the wheel when the brake is actuated.

Referring now in more detail to the illustrated brake assembly 10, the relatively stationary or fixed brake part 12 is a generally disc-shaped housing having a circular side wall 40 bounded circumferentially by a circular flange-like edge wall 42 which extends beyond one side of the side wall. The housing has an open side (i.e. the left side in FIG. 2) opposite the side wall 40. Extending from the inner side of the side wall 40 of the open side of the housing is a cylindrical hub 44. Side wall 40, edge wall 42, and hub 44 are all coaxial with the rotor rotation axis 18.

The brake rotor 14 comprises a friction disc having a central bore 46 rotatably receiving the hub 44 to rotatably journal the disc on the hub. The hub 44 and bore 46 thus constitute the bearing means 16 which rotatably mount the rotor on the fixed part or housing 12. The rotor friction disc 14 is retained on the hub 44 by a shoulder plate 48. This shoulder plate is bolted or otherwise releasably secured to the end of the hub to permit removal of the disc from the placement of the disc on the hub.

Figure 2:
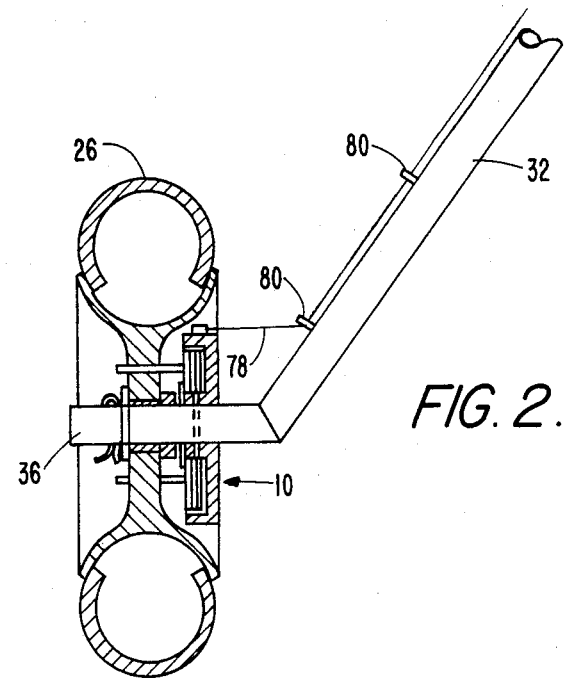
FIG. 2 is an enlarged section through a landing gear wheel and wheel brake assembly of the ultralight in FIG. 1.

In this preferred embodiment, the means 20 for mounting the brake assembly 10 on the ultralight 30, comprises a bore 50 extending coaxially through the hub 44 for slidably receiving an axle 36 of an ultralight wheel strut 32. The brake assembly is situated on the axle adjacent its inner end to permit rotatably mounting the wheel 26 on the axle outboard of the brake assembly, as shown in FIG. 2.

The brake assembly 10 is retained on the axle 36 by a cross pin 52 which extends through aligned transverse passages 54, 56 in the axle and the hub 44. The length of this pin is substantially equal to or slightly less than the outer diameter of the hub. The rotor disc 14 retains the pin 52 in the axle and hub passages 54, 56. Thus, the brake housing 12 is fixed against rotation and axial movement on the axle 36, and the brake assembly is removable from the axle by removing the cross pin 52 and sliding the brake housing 12 from the axle. The cross pin is removed by first removing the plate 48 from the hub 44, then sliding the friction disc 14 from the hub, and thereafter sliding the pin 52 from the axle and hub passages 54, 56 through an aligned hole 58 in the brake housing edge wall 42. These steps are reversed to secure the brake assembly to the axle.

As noted earlier, the brake rotor 14 has coupling means 24 for coupling the rotor to the wheel 26. This coupling means comprises pins 60 secured to the rotor disc and extending axially therefrom, through the open side of the brake housing 12, between the housing edge wall 42 and the edge of the shoulder plate 48. These pins extend through openings in the wheel to couple the brake disc to the wheel. These openings may be holes in a wheel disc, as shown, or the spaces between spokes of a spoked wheel.

The brake means 28 of the illustrated brake assembly 10 comprises a brake band 62, in the form of a relatively stiff but resiliently flexible wire, extending circumferentially about the brake disc 14 within a peripheral groove 64 in the disc. One end 66 of this band is bent laterally through a slot 68 in the brake housing edge wall 42 to fix this end of the band to the brake housing 12. The opposite end of the brake band is also bent laterally and then at right angles to form a hook 70 which extends through a circumferentially elongated slot 72 in the edge wall 42. Movement of this hook end 70 of the brake band 62 toward its fixed end 66 constricts the band about the friction disc 14 to apply a friction braking force to the disc.

Figure 3:
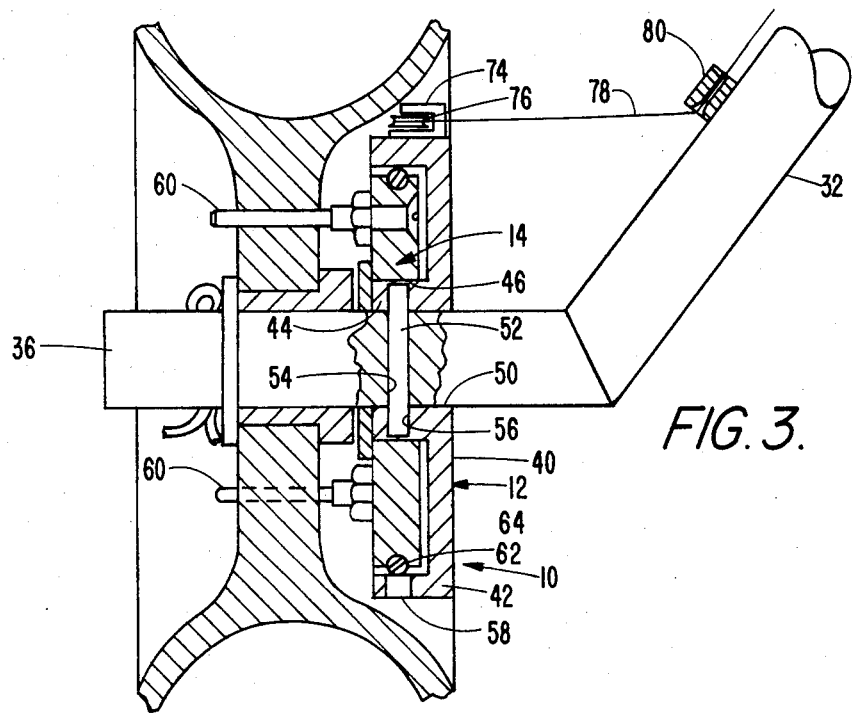
FIG. 3 is a further enlarged section similar to FIG. 2.

As will be seen from FIG. 3, the outside diameter of the brake disc 14 is just slightly less than the inner diameter of the brake housing 12. The depth of the groove 64 in the disc approximates the crossectional diameter of the brake band 62 or is slightly less. The band is captivated between the disc and housing ege wall 42.

Figure 4:
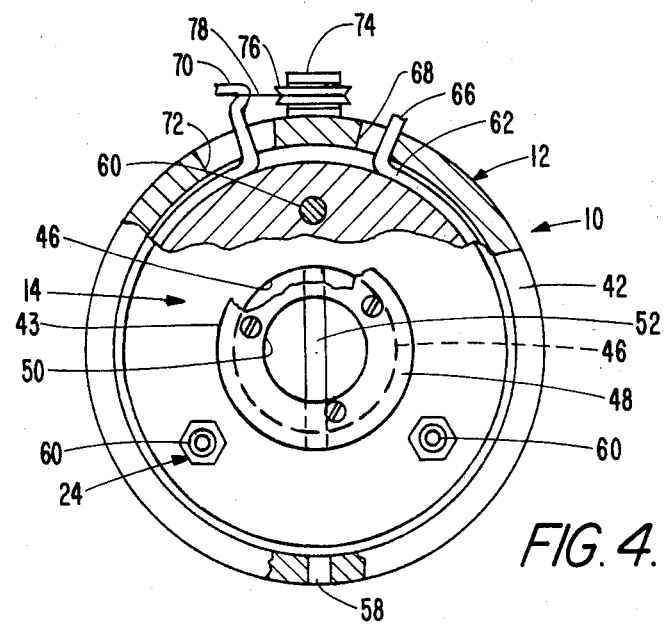
FIG. 4 is an axial view of the brake assembly in FIG. 3 looking at its left-hand or outer side as seen in the latter figure.
Figure 5:
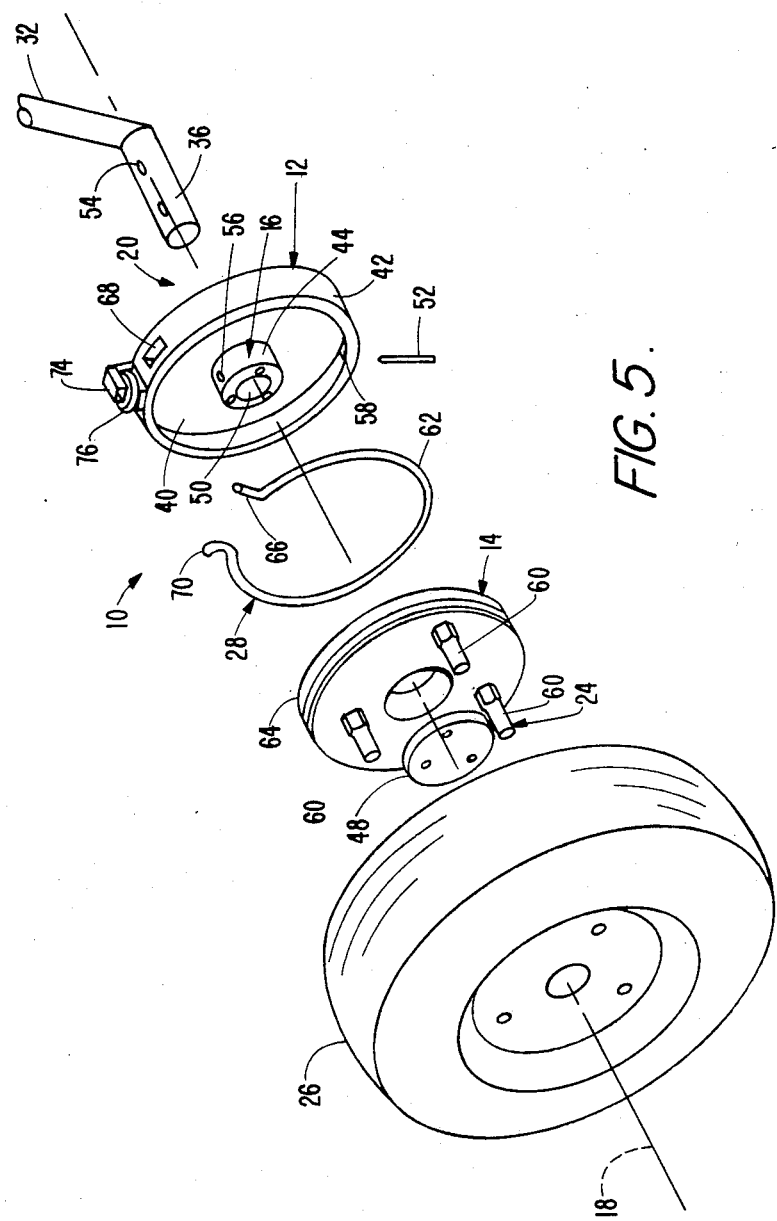
FIG. 5 is an exploded perspective view of the landing gear wheel and wheel brake assembly in FIGS. 1-4.

Rigid on the housing edge wall 42 between the brake band ends 66, 70 is a bracket 74 rotatably mounting a pulley 76. Trained around this pulley is a brake actuating cable 78 which is fixed at one end to the brake band hook 70, as shown in FIG. 4. This cable extends through guides 80 fixed along the wheel strut 32 to a brake pedal or the like (not shown) at the pilot's station of the ultralight. Depression of the brake pedal pulls on the cable 78 to constrict the brake band 62 about the brake disc 14 and thereby apply a braking force to the disc and to wheel 26 coupled to the disc. Each wheel of the ultralight has brake assembly actuated by a brake pedal, whereby the brakes may be selectively actuated individually or in unison to both brake and steer the ultralight while on the ground.

Each brake assembly is self-actuating. To this end, the brake band 62 of each brake assembly is arranged so that the frictional force exerted on the brake band, during braking tends to further constrict the band about its brake disc 14.

I claim:

1. A brake assembly for a vehicle having an axle and a wheel rotatably mounted directly on said axle comprising:
   a relatively fixed part having a bore for receiving said axle;
   a rotor;
   coacting bearing means on said part and rotor rotatably supporting said rotor on said part for rotation about the axis of said bore;
   braking means operable between said part and rotor for selectively braking said rotor against rotation relative to said part, and wherein
   said brake assembly comprises an integral brake unit to be mounted directly on said axle at one side of the wheel on the axle and with the axle extending thru said bore ins aid fixed part and with one side of said fixed part and one side of said rotor facing the wheel, and said rotor includes wheel coupling means extending from said one side of said rotor and beyond said one side of said fixed part for coupling said rotor to the wheel.

2. A brake assembly according to claim 1 wherein:
said bearing means comprises an integral coaxial bearing hub on said part rotatably mounting said rotor, and said bore extends coaxially thru said hub.

3. A brake assembly according to claim 2 wherein:
said means for securing said part to said axle comprises a passage extending diametrically thru said hub in intersecting relation to said bore, and a removable pin within said passage for extending across said bore and through a transverse hole in said axle.

4. A brake assembly according to claim 3 wherein:
said pin is retained in said passage by said rotor.

5. A brake assembly according to claim 4 wherein:
said hub has a free end and said rotor is removable axially from said hub over said free hub end;
means for releasably retaining said rotor on said hub; and
removal of said rotor from said hub permits removal of said pin from said passage to permit removal of said brake assembly from and placement of said brake assembly on said axle.

6. A brake assembly according to claim 1 wherein:
said braking means comprises friction braking means.

7. A brake assembly according to claim 6 wherein:
said braking means comprises a friction brake disc on said rotor and a friction brake member fixed to said part and selectively operable into frictional braking engagement with said disc.

8. A brake assembly according to claim 7 wherein:
said brake member comprises a brake band extending about the periphery of said brake disc and having one end secured to part and its other end operable to constrict the band into peripheral braking engagement with said disc.

9. A brake assembly according to claim 1 wherein:
said wheel coupling means comprise lugs extending from said rotor parallel to and spaced about said rotation axis.

10. A brake assembly according to claim 1 wherein:
said fixed part comprises a hollow housing containing said rotor and having at said one side of said fixed part an open side through which said one rotor side is exposed axially of said rotation axis; and
said wheel coupling means extend from said one rotor side through said open housing side.

11. A brake assembly according to claim 10 wherein:
said wheel coupling means comprise lugs extending from said rotor through said open housing side parallel to and spaced about said rotation axis.

12. A brake assembly according to claim 10 wherein:
said housing includes a side wall opposite said open housing side and a circumferential wall about the edge of said side wall;
said bearing means includes a bearing hub on said rotation axis rigid on and extending from said side wall to said open housing side and a coaxial bearing opening in said rotor rotatably receiving said hub;
said bore extends coaxially through said hub,
said rotor is removable axially from said hub through said open housing side; and
means on the end of said hub opposite said side wall for releably retaining said rotor on said hub.

13. A brake assembly according to claim 12 wherein:
said wheel coupling means comprise lugs extending from said rotor through said open housing side parallel to and spaced about said rotation axis.

14. A brake assembly according to claim 12 wherein:
said brake means comprises a coaxial friction brake disc on said rotor, a friction brake band extending about the periphery of said brake disc and fixed at one end to said housing, and brake actuating means connected to the other end of said brake band and operable externally of said housing for constricting the band about said disc.

15. A friction brake assembly for a vehicle having a wheel supporting axle, comprising:
a housing including a side wall, a circumferential wall about the edge of said side wall and defining an open side of the housing opposite said side wall, a rotory bearing hub rigid on said side wall and extending from the side wall, through said housing, to the open housing side, a bore extending coaxially through said hub for receiving said axle, and a pin positioned within a transverse passage in said hub intersecting said bore for extension through a transverse hole in said axle to releasably secure said housing to said axle;

a rotor rotatable on said hub for retaining said pin in said passage and including a coaxial friction brake disc;

said rotor being axially removable from said hub through said open housing side;

means on the end of said hub opposite said side wall for releasably retaining said rotor on said hub;

a friction brake band extending about the periphery of said brake disc and fixed at one end to said housing;

actuating means fixed to the other end of said brake band through an opening in said circumferential housing all for constricting said band about said disc to frictionally brake said rotor against rotation; and lugs extending from said rotor through said open housing side parallel to and spaced about the rotation axis of said rotor and nuts on said bolts for coupling a wheel to said rotor coaxially with its rotation axis.

16. In combination:

a vehicle having an axle and a wheel rotatably mounted directly on said axle; and a unitary brake assembly on said axle at one side of said wheel including a relatively fixed part having a bore receiving said axle, means securing said fixed part against rotation on said axle, a rotor mounted on said fixed part coaxially with said axle, means on said rotor coupling said rotor and wheel, and brake means selectively operable betweens aid fixed part and said rotor for braking said rotor against rotation relative to said fixed part.

17. A combination according to claim 16 wherein:

said fixed part includes a bearing hub rotatably mounting said rotor; and said bore extends coaxially through said hub.

18. A combination according to claim 17 wherein:

said means securing said fixed part to said axle comprises a pin extending transversely through said hub and axle.

19. A combination according to claim 18 wherein:

said pin is removable and is retained in position by said rotor; and said rotor is removable from said hub; and said brake assembly includes means releasibly securing said rotor on said hub.

20. A combination accordin to claim 16 wherein:

said fixed part comprises a side wall bounded circumferentially by an edge wall projecting beyond one side of said side wall to form a housing opening toward said wheel, and a bearing hub rigid on said side wall and extending through said housing to said open side of said housing and rotatably mounting said rotor;

said coupling means comprise lugs extending between said rotor and wheel and through said open side of said housing.

21. A combination according to claim 20 wherein:

said means securing said fixed part to said axle comprises a pin extending transversely through said hub and axle.

22. A combination according to claim 21 wherein:

said pin is removable and is retained in position by said rotor;

said rotor is removable from said hub; and said brake assembly includes means releasibly securing said rotor on said hub.

23. In an ultralight airplane having a landing gear including a pair of wheel struts with laterally projecting axles, and wheels rotatably mounted directly on said axles, the improvements comprising: a wheel brake assembly mounted directly on each axle at the inboard side of the respective wheel comprising a fixed part fixed to the respective axle and having a side wall bounded circumfetentially by an edge wall extending beyond the wheel side of said side wall to form a housing opening toward the respective wheel, and hub rigid on said wheel side of the side wall and extending from the side wall to the open side of said housing, a bore extending coaxially through said hub through which the respective axle extends, a rotor rotatable on said hub, means coupling said rotor to the adjacent wheel through the open side of said housing, brake means operable between said housing and rotor, and means for operating said brake means.

24. The subject matter of claim 23 wherein:

each brake assembly includes a pin extending through its housing hub and axle and securing the respective brake housing to the axle, and said pin being removable by removal of the respective rotor from the hub to permit removal of the brake assembly.

25. A friction brake assemblly for a vehicle having an axle and a wheel rotatably mounted directly on the axle, comprising:

a housing including a side wall, a circumferential wall about the edge of said side wall and defining an open side of the housing opposite said side wall, a rotary bearing hub rigid on said side wall and extending from the side wall to said open housing side, and a bore extending coaxially through said hub for receiving said axle;

means for securing said housing against rotation on the axle;

a rotor rotatable on said hub including a coaxial friction brake disc;

friction brake means operable between said housing and said brake disc for braking said rotor against rotation relative to said housing; and wherein said friction brake assembly is adapted to be mounted directly on said axle at one side of the wheel on the axle with the axle extending through said bore in the housing hub and with the open housing side facing the wheel, whereby said friction brake disc may be coupled to the wheel through said open housing side.

* * * * *